United States Patent [19]

Hoge et al.

[11] 4,203,837
[45] May 20, 1980

[54] PROCESS FOR REMOVAL OF DISCRETE PARTICULATES AND SOLUTES FROM LIQUIDS BY FOAM FLOTATION

[76] Inventors: John H. Hoge; John H. Hubbard, both of 4204 Airport Rd., Cincinnati, Ohio 45226

[21] Appl. No.: 861,492

[22] Filed: Dec. 16, 1977

Related U.S. Application Data

[63] Continuation of Ser. No. 649,690, Jan. 16, 1976, abandoned.

[51] Int. Cl.² ............................ C02B 1/20; C02C 5/02
[52] U.S. Cl. ........................................ 210/44; 210/47; 210/51; 209/166
[58] Field of Search ................... 210/13, 15, 42 R, 44, 210/51-54, 221 M, 221 P, 47; 75/2; 209/166

[56] References Cited

U.S. PATENT DOCUMENTS

| | | | |
|---|---|---|---|
| 2,778,499 | 1/1957 | Chamberlain et al. ............... | 210/44 |
| 3,238,127 | 3/1966 | Sebba ..................................... | 210/44 |
| 3,404,088 | 10/1968 | Dujardin ............................... | 210/44 |
| 3,542,675 | 11/1970 | Mail et al. ............................ | 210/44 |
| 3,583,909 | 6/1971 | Block .................................... | 210/44 |
| 3,642,617 | 2/1972 | Brink et al. .......................... | 210/44 |
| 3,764,013 | 10/1973 | Eisenmann ............................ | 210/44 |
| 3,772,190 | 11/1973 | Eisenmann ............................ | 210/44 |
| 3,878,303 | 4/1975 | Hashimoto ............................ | 210/15 |
| 3,886,068 | 5/1975 | Eron ..................................... | 210/221 M |
| 4,024,054 | 5/1977 | Zimmermann ........................ | 210/44 |

Primary Examiner—Charles N. Hart
Assistant Examiner—Peter A. Hruskoci
Attorney, Agent, or Firm—Frost & Jacobs

[57] ABSTRACT

A process for removal of discrete particulates from liquids by foam flotation which is readily adaptable to continuous or batch processing. A continuous stream of foam, in which the gaseous medium is subdivided into individual bubbles, each encapsulated in a film consisting of a foaming agent solution, each film being shared with each adjacent gas cell, is pregenerated. The composition of the films of the pregenerated foam may include, in addition to the foaming agent, other agents or reagents useful or necessary for the collection and removal of the solid or solute material being extracted by counter ion action. The pregenerated foam is then introduced at a predetermined rate into the liquid carrying the solids or solutes to be extracted and is dispersed therein. The preformed surfactant films of the bubbles contact and attach the solid particles by counter ion action from the liquid body during the progess of the foam bubbles through the liquid. The loaded foam bubbles are allowed to float to the liquid surfaces where they consolidate into a stable foam layer for convenient removal from the liquid surface. Dissolved materials in a liquid body are similarly extracted by use of film having compositions suitable for ionic adsorption or reagents for precipitation of the soluble material on or within the film.

4 Claims, 13 Drawing Figures

PROCESS FOR REMOVAL OF DISCRETE PARTICULATES AND SOLUTES FROM LIQUIDS BY FOAM FLOTATION

This is a continuation of application Ser. No. 649,690, filed Jan. 16, 1976 now abandoned.

BACKGROUND OF THE INVENTION

1. Field of the Invention

The present invention pertains to the separation of suspended and dissolved materials from liquids by flotation, using pregenerated foams having characteristics specifically formulated for the material being extracted from the liquid body or steam.

2. Description of the Prior Art

The art of flotation separation by means of gas, usually air, for commercial purposes has evolved since the turn of the century. The other techniques of removing solids from liquids are filtration, centrifugation, sedimentation (settling) with or without flocculation, oil flotation, distillation or evaporation, and the like. Dissolved materials may be separated by distillation, electrolysis, precipitation followed by filtration, immiscible liquid extraction, etc.

Figure 1:
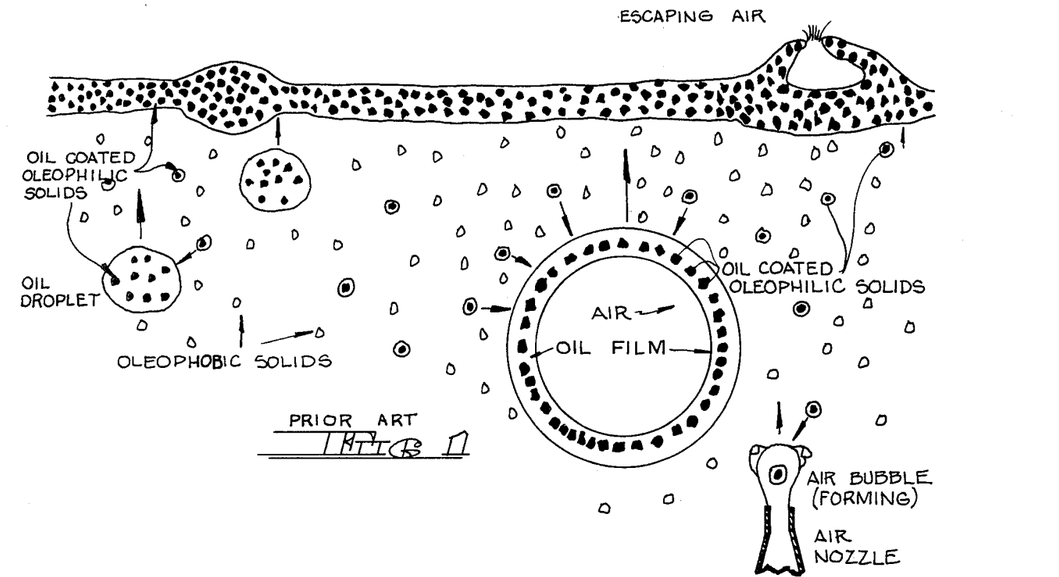
FIG. 1 is a schematic representation of prior art oil-water flotation used in ore beneficiation and oil-water-air improvement in the prior art.

Separation of solids from liquids by flotation is extensively practiced in the field of mineral ore beneficiation. In the early practice, it was found that certain minerals could be preferentially wetted by oils, i.e., their surfaces were oleophilic, or hydrophobic, while the other minerals associated therewith were preferentially wetted by water, i.e., hydrophilic or oleophobic. Thus, as shown in FIG. 1, if a heterogeneous ore is reduced to suitable fineness by wet grinding, and the resulting slurry or pulp is mixed with large quantities of oil, the mixture of minerals can be separated into hydrophilic and hydrophobic fractions. As can be seen, oil coats the oleophilic mineral, but no others. The oil coated particles agglomerate into flotable drops, or form films around air bubbles introduced at the bottom of the slurry body by an air jet, the oil foam formed not only being separated more rapidly from the aqueous suspension, but accomplishing even more complete removal of hydrophobic solids while using only a fraction of the oil quantity required for non-aerated flotation. When the oil floats to the liquid surface it can be recovered by decanting, and filtering the oil would yield the desired minerals.

The success of this so-called froth flotation method stimulated considerable research into the nature of froths and froth films, the relationships between the surface of the various minerals and water and frothing agents, the effects of bubble size, total air volume used, liquid/solids ratios, etc. From such work, it was found that frothing agents other than oils could be used, and that the surface of some minerals, not ordinarily susceptible to froth flotation, could be altered by surface active agents, commonly called "collectors" or "promotors", so as to preferentially associate with air or with frothing agents that, in turn, associated with air bubbles. As the physical chemistry of the liquid-solid-gas interactions became more clearly defined, and as the chemical industry made available greater varieties of surfactants, the list of flotable solids became increasingly longer, and today froth flotation is a wide spread, varied and important ore beneficiation technique.

In recent years, the increasing attention focused on water pollution has encouraged researchers to attempt flotation techniques to remove a variety of polluting species from both industrial and domestic waste water, i.e., sewage.

There are important differences between ore beneficiation and water purification by flotation techniques. The concentration of solids in ore slurries is high, often 30 wt. %, whereas waste waters rarely contain as much as 5%, and usually less than 1% solids. Generally only a single inorganic mineral of high specific gravity is removed in ore practice: wastewaters may contain several polluting species, many of organic compositions and specific gravities close to 1.0, often too diverse in properties for removal by a single combination of collector/frothing agent; they may even mutually interfere with each others' extraction. In ore processing ambient conditions such as temperature, pH, liquid and air flow rates, solid/liquid ratios, etc., can be rather closely controlled; this is rarely possible in wastewater processing. The effluent from ore processing is itself a wastewater, carrying gangue and excess treating agents; the objective of wastewater treatment is to obtain as pure an effluent as possible. The hourly flow rates in ore froth flotation are not only controlled to uniformity but are generally of much lower magnitude than for wastewaters. The removal of dissolved materials is often an important aspect of wastewater purification, but almost never in ore processing.

For these and other reasons, the transference of froth flotation technology from the ore beneficiation application to wastewater purification is neither simple nor complete, and the number of successful commercial applications at present is small.

Some classes of polluting species can be collected by flocculants such as alum, soluble silicates, ferric salts, polyelectrolyte polymers, etc. The usual practice is to add a coagulant or flocculant, and then allow the flocs to settle out of the body of water in quiescent holding tanks, reservoirs or lagoons, the settling requiring many hours even days. Since the settling reservoir capacity must accommodate the maximum flow rate of wastewater, the space requirements for this type of processing are high.

Figure 2:
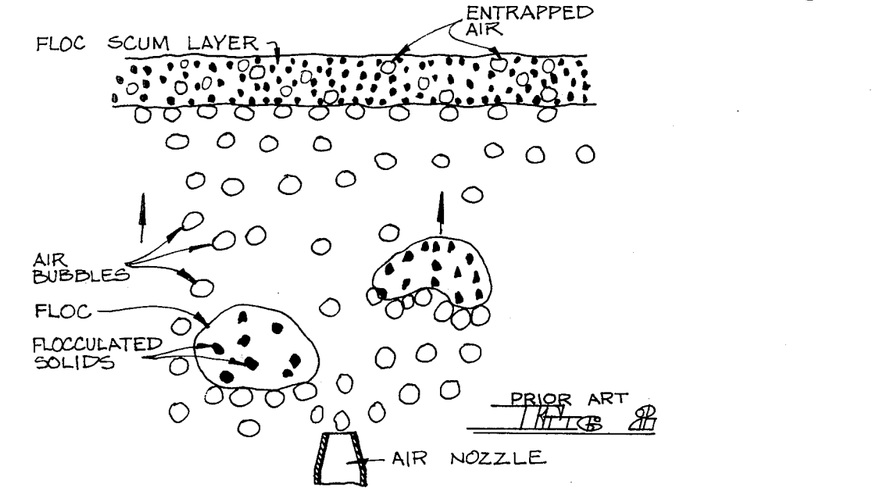
FIG. 2 is a schematic representation of prior art flotation of flocculated polluting species in wastewater.

As will be seen from FIG. 2, for some types of wastewater, it has been found that the floc can be separated more rapidly by floating it to the surface by aeration with continuous streams of fine air bubbles. The particles are first collected by a suitable agent into flocs. Neutral flocs are mechanically pushed to the surface by small air bubbles from an air source. Charged flocs may form thick films by collecting around air bubbles. Some colloids, for example, soaps, readily form films which are loaded with particles picked up from polluted surfaces or from the wastewater. The liquid volume of such decanted or skimmed flocs thus obtained is 10–40% of the total wastewater input, just as with the settlement method, but the separation is much more rapid. Processes of this type are not true flotation; the air bubbles do not attach to the flocs, but simply push the relatively large floc masses to the surface at a rate much faster than the flocs would settle by conventional sedimentation. In true froth flotation part of the air remains associated with the floc, and this froth is collapsed after the skimming or other removal step. The resulting floc slurry is usually only 5–20% of the original waste water volume.

Figure 3:
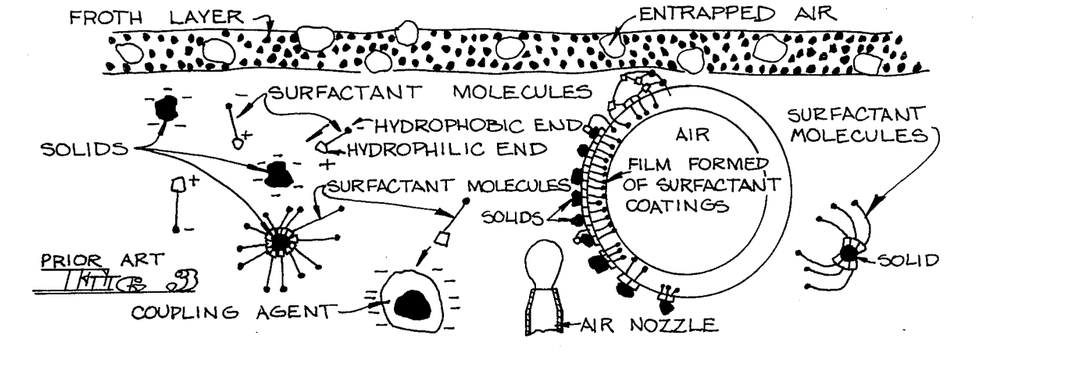
FIG. 3 is a schematic representation of prior art foam flotation, with and without a coupling agent.

In applying the froth flotation principles of ore treatment to the treatment of wastewater, the first step is to find a surfactant having a molecular structure with a hydrophilic portion that has a strong affinity for the polluting species sought, and a hydrophobic portion to preferentially associate with air. If no single surfactant can be found, it may be possible to employ one or more additional compounds, sometimes called coupling agents, that attach to and alter the particle surface, causing it to acquire affinity for a flotation agent added subsequently. As can be seen in FIG. 3, when air is bubbled through the aqueous suspension of such coated particles, the hydrophobic portion of the surfactant is attracted thereto, causing the pollutant to become associated with the air bubbles. As each bubble rises through the liquid body, it may collect many particles, and at the surface of the liquid, the coated particles come together to form films, becoming a fairly stable froth.

FIG. 3 discloses the flotation of particles having a natural surface charge. A surfactant is added to the wastewater and attaches to the surface of the particles. The hydrophobic portion of the surfactant is attracted to the air interface of rising air bubbles from the air source. The smaller each air bubble, the fewer coated particles are needed for form a complete, and therefore stable, film.

As the supply of agent-coated particles is depleted, the partial films that form at the air-liquid interface of the bubbles become increasingly susceptible to separation from the air bubbles by the friction of the travel in the liquid and by turbulence. However, since large volumes of air are used, any material dropped by one bubble will be picked by those following, so that given sufficient time and air, the transference of all the polluting particles to the surface will be fairly complete.

There are several limitations to froth flotation practice. The surfactant must have strong enough hydrophobic characteristics to attach and hold the particles to the air bubble. Enough surfactant must be present on the particle surface to achieve this. The amount of surfactant thus depends on the quantity, size and specific gravity of the particles. Since the turbulence normal to both the introduction of air streams and of upward-rising bubbles tends to shear off the particles from the bubbles, the rate and mode of air feed must be closely controlled, and this determines the retention time for the process. Excessive air input also disturbs the froth layer, which can cause falling out of the collected particles, or the excess air may inflate the existing foam bubbles to the destabilization point, producing a similar affect. In general, the foam blankets or layers from froth flotation processes have minimal stability, and mechanical skimming or other methods for removal of the foam must be affected promptly and as gently as practicable.

Relatively few surfactant or flocculation combinations have been found useful for commercial froth flotation application, especially for high volume wastewater treatment, because they are too sensitive to variations in ambient conditions, because the time and air volumes required are uneconomical, because the agents required are too expensive, or for a variety of other reasons.

Various method are used to introduce air into the liquid in aeration and froth flotation practice. Since turbulence disrupts the accumulation of pollutant particles and destabilizes the floating froth layer, causing loss in sinking of the collected material, gas flow rates must be kept relatively slow and such large orifice devices as spargers and open pipes are unsuitable. Accordingly, special ceramic plates having many fine capillary tubes, finely perforated metal plates, beds of glass or ceramic frits and the like are used, with flow rates low enough to permit the continuous air stream to separate into discrete bubbles as it leaves the air channel orifice. In some cases the bubbles are passed through screens to reduce their size. However, according to Grieves, et al, in *Adsorbtive Bubble Separation Techniques*, edited by Robert Lemlich (Academic Press, 1972), at page 174, "bubble diameter is generally not at the control of the design engineer, varies with time and position, and is difficult to measure experimentally." For most flotation processes, fine bubbles in the order of 50 to 150 microns are preferred, but their attainment in quantities required for treatment of large volume flows of wastewater is difficult.

A method used to obtain very fine bubbles for flotation is the dissolved air process. Wastewater is subjected to pressure in the presence of air, causing some air to dissolve. A flocculating agent, sometimes with a foaming agent, is injected into the liquid body. Upon sudden release of the pressure, the dissolved air comes out of solution to form a fairly uniform dispersion of fine air bubbles which float the floc. The effect is similar to the release of $CO_2$ from carbonated beverages.

The low solubility of air in water obviously limits the amount of froth that can be generated by the dissolved air process, unless several cycles of pressurizing are used. In general, the cost of power and special equipment required, together with the mechanical difficulty in adaptation to continuous, high volume processing has limited the use of the dissolved air method.

Froth flotation has been applied to a variety of separation problems. Some soluble polluting species can be precipitated by suitable reaction and the precipitate subsequently removed by froth flotation. Obviously, by proper choice of agents, a mixture of species can be fractionated, separating only one specie in each flotation step.

SUMMARY OF THE INVENTION

The present invention greatly increases the efficiency and scope of flotation separation by employing a completely different method of producing both the bubbles and their encapsulating films. This novel process, which is readily adaptable to continuous or batch processing, consists of first, separately forming, i.e. pregenerating, a continuous stream of foam in which the gaseous medium is subdivided into individual bubbles, each encapsulated in a film consisting of a foaming agent solution, each film being shared with each adjacent gas cell. The composition of the films of the pregenerated foam can include, in addition to the foaming agent, other agents or reagents useful or necessary for the collection and removal of the solid or solute material being extracted. The foam bubble size, or size distribution, the film thickness (as well as its composition) and the rate of foam generation, are preselected and closely controlled for the application intended.

This pregenerated foam is then introduced at a predetermined rate into the liquid carrying solids or solutes to be extracted and it is dispersed therein, using suitable mechanical means, or it may be dispersed by its own buoyancy, with or without baffling means. The preformed surfactant films of the bubbles contact and attach the solid particles from the liquid body by counter ion attraction during the progress of the foam bubbles through the liquid. The loaded foam bubbles are allowed to float to the liquid surface where they consolidate into a stable foam layer for convenient removal from the liquid surface by mechanical scraping, decantation, vacuum or other suitable means. Dissolved materials in a liquid body are similarly extracted by use of films having compositions suitable for ionic adsorption or reagents for precipitation of the soluble material on or within the film.

BRIEF DESCRIPTION OF THE DRAWING

FIG. 8 is a schematic representation of a mode according to the teachings of the present invention extending the mode of FIG. 7 wherein a reagent that will react with the dissolved pollutant is added to the foaming agent solution used to make the pregenerated foam, the reaction thus occurring in or on the foam film and the reaction product being thereby removed by flotation.

FIG. 9 is a schematic representation of a mode according to the teachings of the present invention for soluble polluting species for which no precipitating reagent can be had wherein some extraction is possible by utilizing the pregenerated foam film as an osmotic membrane.

FIG. 11 is a schematic representation of typical equipment for practicing the process according to the present invention.

DESCRIPTION OF THE PREFERRED EMBODIMENTS

The inventors have discovered that the effectiveness of flotation separation of polluting species from wastewater can be very greatly increased by introducing the gas, or flotation, phase as a pregenerated foam rather than as free air or dissolved air. The term "foam", as used herein, is defined as a gas bubble completely encased in a liquid film containing a foaming agent; the film can also contain other useful chemical agents as will be subsequently described. The term "pregenerated", as used herein, means that the foam used in the process of the invention is formed, or generated, as a separate phase or substance, prior to being mixed with wastewater. Pregenerated foam retains its identity and pre-selected characteristics even in high levels of turbulence in the wastewater stream, and quickly reagglomerates into a cohesive blanket or layer on the surface of the wastewater body whenever it is allowed to float, thereby effecting rapid and stable separation from the liquid body.

Use of pregenerated foam provides a second very important advancement to the art. The foam liquid that forms the films can also serve as a vehicle for a wide range reagents and surfactants. This makes it possible to combine two or more compounds into a "tailored" composition specifically suitable to the polluting specie to be extracted. Furthermore, since these agents are present in the foam film, and the foam solution is only 1/250th of the volume of the wastewater it treats, the concentration of the agent in the foam film is 5000 times as great as it would be if an equal amount of agent were dispersed in the wastewater. This greatly enhances the effectiveness of the agents as collectors of the pollutants. Alternatively, much lower quantities of agent can be used than according to present practice.

As the term "pregenerated" implies, the foam of the present invention is formed, or generated, before being put to use. Common examples of pregenerated foams are aerosol shaving cream foams, aerosol fabric shampooing foams, foams used in fire fighting practices, and egg white foams used in meringues and cake baking. Foams may be pregenerated in various ways. A suitable quantity of a foaming agent may be dissolved in a liquid and the solution mechanically whipped, as by high-velocity propeller devices. Foaming agent solutions may also be aspirated by a high velocity gas stream through a specifically designed orifice or a Venturi-type chamber where it forms films to encapsulate the gas. In yet another method of foam generation, the liquid may be continuously flowed upon a wire screen positioned in a stream of gas; this action resembles the familiar bubble-forming ring toy. A preferrable embodiment is to accurately meter streams of gas and foam solution separately and under pressure into designed tubes or columns filled with packing. The packing may be Rauchig rings, beads of various materials and shapes, fibrous materials such as steel wool, copper tape, glass or plastic fiber, etc. The nature of the packing, together with the tube or column design, the type and concentration of foaming agent used, the pressure applied in introducing the gas and solution and the rate of foam generation, all control the characteristics of the resulting foam. The foam generating units of this type can be preset and controlled to provide the type of foam best suited for any desired floation operation.

It has been discovered that by preforming gas bubbles completely encapsulated in uniform films of preselected characteristics, and suitably dispersing them in liquids containing particulate or dissolved material, the material can be collected, floated to the surface of the liquid and removed therefrom much more rapidly, reliably, completely and economically than by the present art of froth flotation in which bubbles with films, or partial films, are formed only during the passage of the gas through the liquid body itself. Furthermore, pregenerated foams can be used to remove many species of material from liquids not heretofore possible by frothing or other flotation methods.

By using pregenerated foams, the thickness, viscosity and composition of the films surrounding the air cells can be controlled so as to give almost any degree of stability. This makes it possible to disperse the foam mass in a liquid as discrete bubbles or as small clusters of bubbles, and circulate the bubbles by turbulent flow or mechanical mixing for long enough periods of time so that the outer hydrophilic film surfaces of a small volume of foam bubbles are rapidly brought into contact with substantially all of the solids or solutes being extracted. In addition, the strength or stability of the film is also controlled so that after the loaded foam bubbles are allowed to float to the surface of the liquid, they will reagglomerate and stably retain their particle load until removed from the surface by any convenient means. By contrast, both the dispersion and subsequent removal of low-stability froth bubbles formed in prior art practice are often limited to gentle, non-turbulent methods, resulting in longer processing times and lower removal efficiency.

The term "polluting specie" is commonly used in wastewater treatment technology to designate a material that must be removed so that the water can be re-used. Pollutants are not necessarily useless waste materials. In food industries, such as meat processing, brewing, fruit and vegetable canning, starch processing, dairy and similar operation, the "polluting specie" often has considerable economic value as poultry and farm stock feed or as fertilizer. In the chemical industry, the pollutant may be useful material, such as latex polymers in the effluent of paint manufacture.

As used herein, the term "polluting specie" is understood to mean the substance or material to be removed from a liquid. It may exist as suspended solids, as dissolved solids, as dissolved gas, as a colloidal suspension, as a floc or gel, or in any other state. Furthermore, this invention includes the alteration of the natural state of the polluting specie to facilitate flotation by the pregenerated foam. Examples of such alternation include, but are not limited to, flocculation of suspended solids, precipitation of dissolved solids and gases, complexing of dissolved and suspended solids with reagents such as soluble silicates, altering the surface active character of solids by adding collecting agents, desolubilizing dissolved matter by changes of pH and the like, etc. This process is by no means limited to extraction of the polluting specie in its original state, and, indeed, it is a feature of this process that it makes possible the controlled modification of the pollutant whereby to efficiently and economically remove it rapidly by flotation from the liquid body.

There are several physio-chemical mechanisms by which pre-generated foam can be used to remove polluting specie from liquids.

Figure 4:
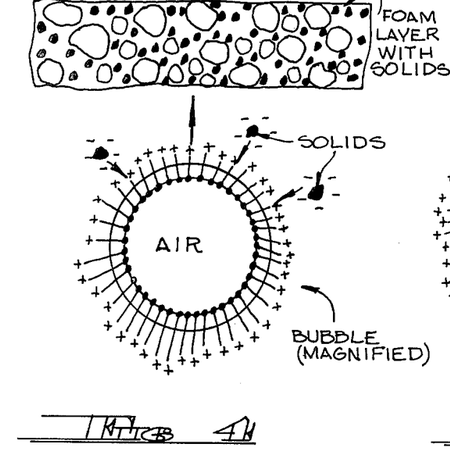
FIG. 4 is a schematic representation of the simplest mode according to the teachings of the present invention which utilizes a foam of a specific surfactant to remove an untreated polluting specie.

The simpliest mode of the process of the present invention is shown schematically in FIG. 4. There foam is generated containing a single surfactant having in its molecule a hydrophilic portion that is specifically attracted to the specie to be removed, and a hydrophobic portion that will orient to the liquid-air interface of the film of the bubble. This orientation causes the hydrophilic end to be directed outward to the foam liquid-water interface, creating a concentration of charges on the film surface that attract the charges on the surfaces of the polluting specie. Alternatively, some portion of the foaming agent surfactant may chemically react with the polluting specie particle or part of it so as to attach it to the bubble film. The stable form bubble is circulated through the liquid body by mixing action whereby to encounter and attach to itself numerous particles before being released to float and unite with the foam layer on the surface of the waste liquid. The collecting mechanism of the single agent foam mode of extraction is similar to that employed for a variety of minerals in mining ore beneficiation. The ore slurry is heavily dosed with surfactant to insure that enough molecules will be available to each particle to create a hydrophobic surface condition that will attach to and remain fixed on the air-liquid interface of the air bubbles that are subsequently dispersed in the ore slurry. The air bubbles actually collect enough coated particles to form adequately stable films, since such slurries have high solids contents. There is also an excess of dissolved surfactants in the water to supplement film formation.

The present invention affects removal of low concentrations of particulate polluting species by concentrating the surfactant in the pre-generated bubble film instead on the particles of solids, which are relatively few in number compared to ore slurries. This creates a large attraction surface and avoids contamination of the liquid with the surfactant. The method is, therefore, the reverse of that used in ore processing.

Examples of the use of this simple basic flotation mechanism are oil foam to extract coal, other oils, asphalt suspensions and similar hydrophobic material. CETOL will remove clay solids from river water. Water soluble salts of cymene sulfonic acid selectively attract copper compounds.

Figure 5A:
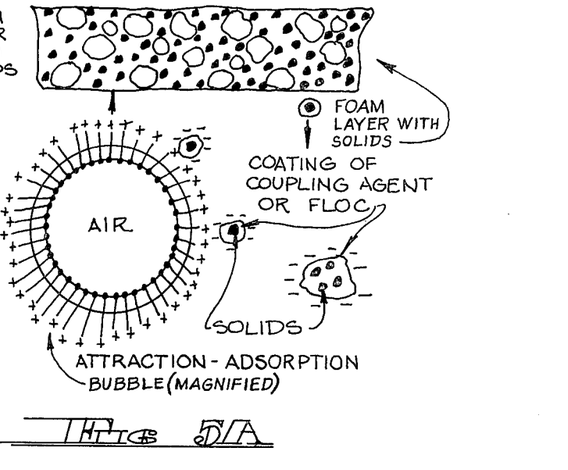
FIGS. 5A and 5B are schematic representations of a mode according to the teachings of the present invention showing alteration by coupling agents of particle surfaces to be attracted to or reacted with foaming agent surfactants.
Figure 5B:
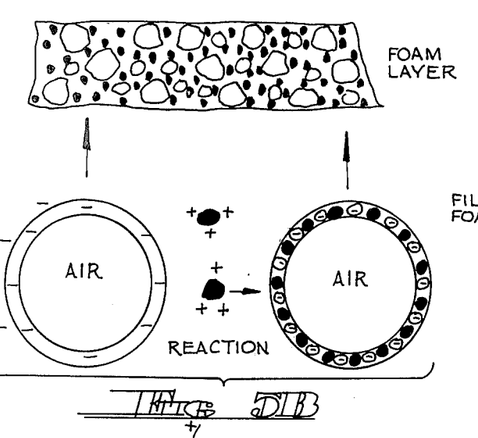

Considering the number of polluting species that require separation from liquids, there are relatively few surfactants that are both specific and capable of forming foams, a factor that has limited the application of flotation methods. By the process of the present invention the scope of flotation extraction can be greatly broadened, using a second physio-chemical mechanism shown in FIGS. 5A and 5B, namely, altering the surface active characteristics of the polluting specie so that it is made attractive to the surfactant that serves as the foaming agent for the pregenerated foam. The coated particles may simply become attached to the surface of the bubble film, as shown in FIG. 5A, or they may become incorporated within the film itself, as in FIG. 5B. Such alteration might be done by simply changing the pH of the liquid body, or by adding a reagent that forms a new compound on the surface of the particles, the new compound having characteristics attractive to a foam agent. Another approach is to add a surfactant not itself a foaming agent, that is attracted to both the specie surface and to the foam agent used. Agents used to alter the surface characteristics of a specie for the purpose of flotation are called coupling agents.

Further variations of the alteration of the polluting specie are the encapsulation of the particles in flocs (alum, ferric chloride, soluble silicates and the like) and collecting the flocs by suitable foaming agents, and the coating of the particles with non-polar agents, such as, for example, oils, for which there are several specific foaming surfactants. Agents of this type are known as collecting agents.

In a variation of this method of removal, the coating reagent may chemically react with some of the foam agent surfactant in the bubble film. The film itself thus becomes a partial floc surrounding the air bubble, the floc containing the polluting specie. Other methods of altering the nature and surfaces of the polluting specie will be apparent to those skilled in the art. It will also be understood that, for any prior art practice wherein an amphipathic surfactant specific to the polluting species can be added to the polluted liquid whereby to affect flotation by subsequent air bubbling, the collection speed and efficiency would be greatly enhanced if a pregenerated foam of the same amphipathic surfactant were used instead of air alone. The hydrophobic portion of the molecules attached to the particles would readily and securely merge with the identical molecules in the foam film.

Figure 6A:
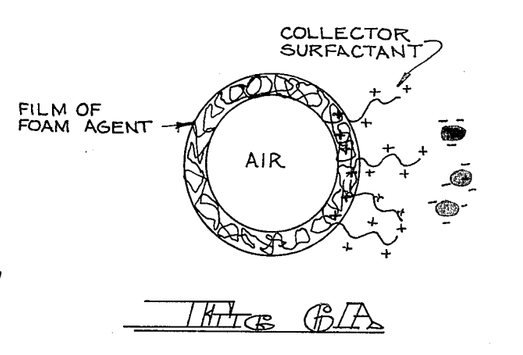
FIG. 6A is a schematic representation of a mode according to the teachings of the present invention wherein a foaming surfactant specific to the polluting specie cannot be identified, but for which it is possible to combine an agent having good foaming capabilities with another agent not effective as a foamer but specific as a collector of the polluting specie.
Figure 6B:
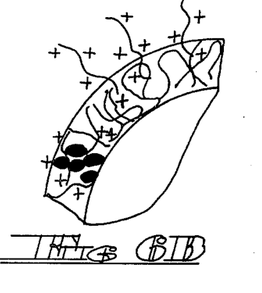
FIG. 6B is an enlarged view of the film of FIG. 6A.

If a foaming surfactant specific to the polluting specie cannot be identified, it may be possible to combine an agent having good foaming capabilities with another agent not effective as a foamer but specific as a collector of the polluting specie in accordance with a third mechanism that can be employed by the process of the present invention, as shown in FIGS. 6A and 6B. There the pregenerated foam is utilized as the vehicle for agents that may not themselves be hydrophobic but which are capable of enhancing the attraction between the polluting specie and the film. The process of such agents in the film of the foam converts an otherwise weakly attractive bubble film into a collector.

The collector agent, such as a long chain polymeric polyelectrolyte, is incorporated in the foam film and is compatable with the foam agent. Whenever the bubble film encounters a particle of polluting specie, the collector agent binds it into the foam film. It should be noted that if the same polyelectrolyte were first added to the polluted liquid, it would attach to and collect the polluting species into flocs, but these flocs might not in turn attach to a foam agent bubble film or the flocs might form in masses too heavy to float.

As with the modes previously described, the multicomponent bubble film may attract and hold particulates by physical or chemical means, or both. For example, a nonionic foam film containing a soluble silicate will complex with starches and some milk solids; subsequently, but before releasing the foam-wastewater blend into the separation chamber, an injected dosage of $CaCl_2$ will precipitate the silicate and its complex to form a film floc that continues to surround the air bubble, hence float-separates readily. An ionic foam can be made to contain substantial quantities of alum, an effective commonly used flocculating agent. By distributing the alum in the thin films of the foam, its availability is enhanced; more important, the flocs it forms are already associated with the air of the foam bubbles, hence float and collect rapidly.

Several types of polymeric polyelectrolytes have sufficient viscosity and molecular weight to serve as foaming agents. Such highly polar, long chain molecules are highly effective collectors of flocs having charges opposite from their own, and cause these flocs to become incorporated in the bubble film. If the polyelectrolyte film is too soluble to remain associated with the air bubble, its long molecular chains can sometimes be entangled or retained by including a long chain, pituitous compound, not necessarily polar, in the foam film. Examples are polyvinyl pyrrolodone, cellulose derivatives and polyoxides.

It will be clear to those skilled in the art that in the process of the present invention, supplemental agents and chemicals can be used simultaneously to alter the character of the polluting specie and to vary the nature of the foam film. This makes for an almost limitless number of possibilities for extraction, and several examples have been found in which a given specie has been collected by both anionic and cationic foaming agents, in accordance with this invention.

Figure 7:
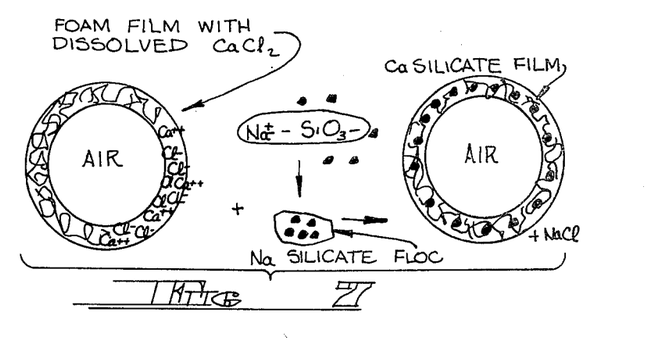
FIG. 7 is a schematic representation of a mode according to the teachings of the present invention wherein reagents are utilized to both alter the polluting specie and to modify the foam film so as to make inexpensive agents effect the removal.

In the process of the present invention, it is frequently useful to use reagents to both alter the polluting specie and to modify the foam film, whereby to make inexpensive agents effect the removal rather than exotic, expensive compounds that are specific. An example of this "duplex" application or mechanism or mode according to the teachings of the present invention is depicted in FIG. 7, wherein the polluting specie particles are first coated by a soluble silicate; in acid liquids, the silicate will form gels or small flocs. A pregenerated foam containing a soluble calcium ion, e.g. $CaCl_2$, is then blended with the dosed liquid, and whenever this foam film encounters a silicate floc, the Ca ion precipitates the silicate into an insoluble calcium silicate gel. The foaming agent selected for this operation would be one that has attraction for such calcium-silicate flocs, which contain the polluting specie. Flotation extraction of this type is clearly not possible by prior art methods.

The process of the present invention can be used to remove dissolved material. It should be noted that a prerequisite for this fourth mechanism or mode is that the dissolved material must be capable of precipitation by a reagent. The reagent is incorporated in the film of the foam, so that when the foam is thoroughly blended with the polluted liquid, the precipitation reaction occurs on the surface of, or within, the film. The floating of the bubble quickly removes this reaction product as a finally divided solid.

Precipitation of very dilute solutions of soluble compounds characteristicly produces exceedingly small particles, such as microcrystals. They may be so small in size that very long periods of time would be needed to obtain settlement, even though their specific gravity may be high. This is similar to the Tyndall effect. Such particles will generally pass through conventional filters, and are practically impossible to remove by present art flotation methods.

The process of the present invention provides a novel solution to the problem of precipitating and removing soluble polluting species rapidly, efficiently and economically. A foaming agent having attraction properties for the precipitate is combined with the precipitating agent, and the solution is used to pregenerate a foam. When this foam is blended with the polluted liquid, the large surface area created by transforming the foam liquid into thin films provides rapid access of the agent to the dissolved pollutant. The precipitate is formed in the film, or on its surface, hence is already collected and enroute to removal without further processing.

A simple example of this mechanism is the removal of calcium ions from water using a foam consisting of Ultrawet K and sodium silicate. The reaction product, calcium silicate, is a floc that remains incorporated in the Ultrawet bubble film.

As another example, dissolved alum can be removed by blending with a foam using AMMONYX 27 as the foaming agent, the two compounds reacting to form a precipitant, but the excess AMMONYX continuing to function as a foaming agent.

The method illustrated in FIG. 7 can be extended to the removal of dissolved polluting solids, as illustrated by another simple reaction shown in FIG. 8. To the foaming agent solution used to make the pregenerated foam is added a reagent that will react with the dissolved pollutant. In FIG. 8, a soluble silicate is shown to remove calcium ions (e.g. "hardness" in water) by reacting to form an insoluble calcium silicate gel in the foam film. Both anions and cations can be removed in some cases, a single reagent may form double salt precipitates, and in other cases two foam treatments may be required, one for the anion, another for the cation. In some cases, the foam agent itself may react with a dissolved polluting specie. In general, the microcrystals that would be formed by simply dosing the polluted liquid with a precipitating reagent would be difficult or impossible to collect and float by prior art methods, even if suitable surfactants for the microcrystals could be had.

For soluble polluting species for which no precipitating reagent can be had, some extraction may be possible by using the pregenerated foam film as an osmotic membrane, as indicated by the mode according to the teachings of the present invention as shown in FIG. 9. For this purpose, thick films are usually desirable to provide a larger liquid volume into which the ions migrate from the polluted liquid body. Chelating agents can be incorporated in the film in some cases. Foams can be made using non-aqueous solvents to which dissolved or colloidal pollutants will migrate in preference to remaining in the polluted water; the foam in this case serves as a form of flash mixing by dispersing small amounts of solvent as a large area of thin films to expedite solvent extraction.

Figures 4, 10:
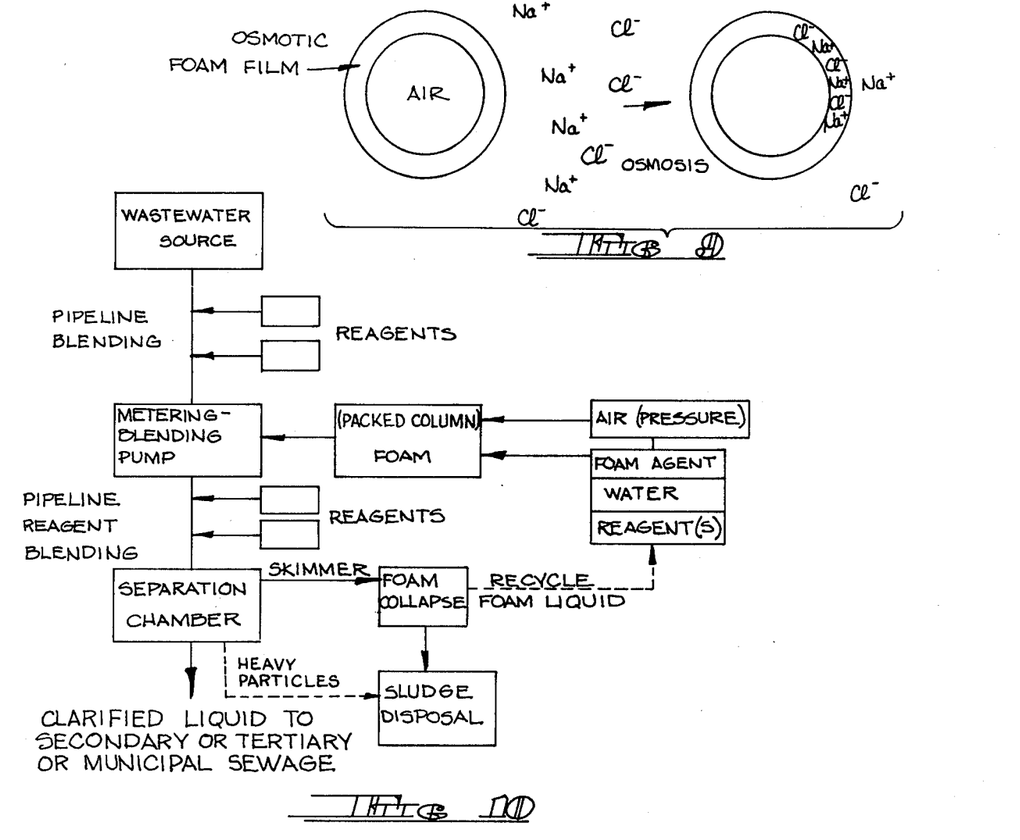
FIG. 10 is a typical schematic flow diagram of the process according to the present invention.

FIG. 10 is a schematic flow diagram of the process of the present invention. The stream of polluted liquid, which may for convenience be briefly retained in a surge tank, is fed to other flow rate control means which serve to control the liquid flow rate and to blend the pregenerated foam with the liquid. Reagents can be added to the liquid enroute to the pump or flow rate control means, the point of injection being governed by the time required for the reagent to perform its intended function. The liquid can also be heated, cooled, screened, aerated, or be given any other physical treatment useful to the purification prior to entering the pump or flow rate control means.

Concurrent with the flow of liquid into the pump or flow rate control means is the introduction of pregenerated foam at a predetermined fixed rate. Accordingly, if the pump or flow rate control means is speeded up, the additional capacity generated is satisfied by an increased volume of liquid, thereby increasing the ratio of liquid to foam; slowing the pump or flow rate control means decreases the ratio. In FIG. 10, the embodiment of the foam generator comprises a closed vessel containing the previously prepared foam solution, i.e. the solvent (such as water), a foam agent dissolved therein and any reagents required to be incorporated in the foam film. The vessel is pressurized by a source of compressed gas, thereby forcing the foam solution through a metering orifice and into the packed column, where it joins a stream of gas at equal pressure conveyed by hose or pipe line from the top of the pressure vessel through another metering orifice. Liquid and gas interact on the surfaces of the packing in the generator packed column to produce a foam which flows into the metering pump or flow rate control means. The characteristics of the foam are controlled by the geometry of the column, the type of packing, the pressure of the system and the relative volume of gases and foam solution used.

The mixture of foam and liquid blended by the pump or flow rate control means may be subjected to additional blending and mixing by suitable pipe line devices as well as by turbulent flow in the pipe line to the separation chamber. This action can be controlled in part by the length and diameter of pipe line used. Additional reagents can be injected into the stream during this transit step of the process.

The blend of foam and liquid is released into a suitably designed separation chamber, preferably with an upward flow direction to accelerate the separation of foam from the liquid. The rising foam bubbles, loaded with polluting specie, coalesce into a mass to form a blanket or layer which is removed by skimming, scraping or even simple overflow, into a collection vessel. In this vessel, the foam drains and collapses, or can be collapsed as by heat, ultrasonics, antifoam agents and the like. It may collapse to form a sludge, or it may separate into a liquid and a sludge. If the liquid is re-usable, it can be removed by filtration or other suitable methods, and recycled. The sludge is disposed of as required, e.g. to land fill, by-product recovery, incineration, etc.

The liquid is withdrawn from the separation chamber by flowing over the top of the upwardly disposed vane, then downward to the exit port. The configuration of chamber and vane provides a steady reduction in the flow velocity rate of the liquid, whereby to facilitate the escape of the bubbles during this "settling" flow. It is convenient to provide a configuration to the bottom of the chamber whereby any solids dislodged from the foam layer will be collected separately for periodic removal as required.

The clarified liquid passes to the water shed, and may receive further purification treatment en route thereto.

FIG. 11 is a schematic representation of typical equipment for carrying out the teachings of the present invention. The liquid head or surge tank 10 is sized to accommodate the range and surge overload of liquid flow expected. If reagents or other additives are introduced at this point, the sizing of the tank may require consideration of time required to dissolve and disperse the agent by mechanical agitation or by air flash mixing.

The tank 10 may be equipped with a float control or liquid level sensor that will regulate the flow rate of the metering/blending pump 12 and foam generator unit 14; it would also regulate the additive feeder to maintain dosage rates.

The metering/blending pump 12 may be a positive action centrifugal or other type of pump, suitably sized for the expected flow rate combined with the input volume of the foam from the foam generation unit 14. The use of variable speed drive activated by a sensor on the liquid head or surge tank 10 permits minimizing the volume of the tank 10 for surge accommodation. No pump is required if adequate gravity flow can be obtained between the tank 10 and the separation tank 16; foam would be added through a pipe line blender 18.

The foam generator unit 14 is small and may be conveniently located remote from the liquid tanks. The sizing of the foam liquid tank 20 is based on foam requirements at 2–4 pcf foam density; two tanks can be used alternately for medium flow rates (12–30,000 gph) and autofoam continuous generators can accommodate flow rates to 500,000 gph and higher.

The foam gun is a small (12–36 inch length) packed column designed to produce the characteristics of foam required for the process application involved.

Gases other than air can be used as required.

Normally the metering/blending pump 12, together with a turbulent flow induced in the pipe sections between the pump 12 and the separation tank 16 will provide adequate intermingling of foam and liquid for collection of particulates and/or chemical reactions. However, a variety of pipe line blenders 18 are available to increase or accelerate this mixing operation.

The liquid flow velocity diminishes during the entire passage through the flotation or separation tank 16 to facilitate complete removal of any very small bubbles, or bubbles carrying heavy particle loads. The initial flow direction is upward, and at the surface the foam bubbles reconsolidate into a stable layer which is continuously decanted. The liquid flow velocity continues to reduce during the downflow in the second chamber 22 of the tank 16, providing settlement collection of any infloated but liquid-conveyed solids and any drop-outs from the foam layer. Normally, the sludge accumulation in this chamber is too small to require continuous withdrawal.

The effluent flow rate in the flotation or separation tank 16 is balanced to the net liquid input rate by a sensor controlled regulator valve.

The foam layer in the flotation or separation tank 16 will self-decant continuously in some application, because of the concurrent direction of liquid flow. However, a variety of skimming, scraping and other decanting devices can be employed. The foam blanket can also be withdrawn by low vacuum.

The sizing of the flotation or separation tank 16 is based on flow rate range and empirical determination of the escape velocity of the loaded foam bubbles, which in turn is dependent on the bubble characteristics selected for the process.

The sizing of the foam collapsing tank 24 is based on the rate of foam accumulation and the rate of collapse, or degeneration, whether natural or induced.

The residual sludge may be further dewatered by settlement, filtration, centrifugation, etc., especially if the solids are usable as by-products or if there is economical or environmental reason to recover the foam liquid. In some cases, it may be disposed of without further treatment.

Although the pregenerated foam and froth flotation processes appear similar in that both use film-forming agents, with or without supplemental collector agents, to absorb and float polluting species out of bodies of waste water, it is important to note that there are fundamental differences between the processes that make pregenerated foam flotation far more versatile, flexible and economical.

The processes are compared herewith on the following points.

A. Physical

1. Method of collecting particulate solids in bubble films.

An objective of pregenerating the foam is to produce bubbles encapsulated in durable films having strong hydrophilic surface characteristics for adsorption of the polluting species. By pregeneration, the durability, as well as the chemical composition, of the foam bubble can be closely controlled. This makes it possible to turbulently disperse the foam bubbles throughout the body of wastewater, and to retain them in the liquid body until all the particles have been adsorbed on the films. Thereafter, when allowed to float to the surface of the liquid, the foam bubbles remain stable and retain their particle load even when subjected to vigorous shearing forces. Although the rate of drainage and collapse of pregenerated foam will normally be slower than for froths, this reduction to liquid state can be conveniently accelerated by ultrasonic, thermal, chemical and other means well known to the art.

In contrast to this rapid, turbulent collecting of the particulates by a small volume of pregenerated foam, the bubbles for froth flotation must be released with minimum turbulence and allowed to pursue as direct a linear course as possible to the surface. Since turbulence tends to dislodge the particles of polluting specie from the gas bubble, and to destabilize the froth blanket, the rate of gas feed in the conventional flotation process must be carefully regulated and limited. Thus relative long retention times and large volumes of gas are required to insure contact with all of the particulates between the spaced-apart columnar streams of bubbles. These bubble streams are generated by orifices in aeration plates, or by layers of glass frits, and as much as 200 volumes of gas may be required to treat a single volume of wastewater. The mechanical and physical parameters inherent in the froth flotation method, therefore, make it difficult or impossible to expedite the rate of particle collection from the wastewater, except by increasing the number of air dispersion orifices, i.e. use larger equipment. Additionally the necessity of prolonging the aeration results in unstable high expansion froth at the liquid body surface, thereby complicating the removal procedure.

The treating capacity of dissolved air flotation systems is obviously limited by the solubility of the air in the liquid being treated.

2. Control of the physical properties of the foam bubbles.

The thickness of the foam bubble films and the bubble size for the distribution of sizes can be readily controlled over a wide range by the foam pregenerating equipment. Film thicknesses is a function of the ratio of air to foam agent solution, generally referred to as the expansion ratio; an expansion of 30 means that 30 volumes of air are encapsulated as foam bubbles in one volume of foam solution. The lower the expansion, the greater the film thickness. Foam can be pregenerated over a range of expansion from 1 to 1000, so that a wide range of film thickness is available, and film thickness is one factor in foam stabiliby.

The size of pregenerated foam bubbles can be readily controlled. Common examples of minute bubbles can be seen in aerosol shaving creams and whipped dairy cream. Larger bubbles are used in fire fighting foams. Accordingly production of 50 to 150 micron size bubbles, considered to be optimum for most froth flotations is readily attained by foam pregeneration.

It must be noted, however, that the preference in prior art for fine bubbles in froth flotation originates in the need to minimize turbulence and maximize stability of the bubble itself. As previously discussed, these limitations do not apply to the pregenerated foam flotation process, so that the size of the bubbles can be selected to provide the optimum film surface area in relation to particle density, size and configuration and to provide the buoyancy that will most rapidly float the bubbles to the liquid surface.

Foam bubbles of uniform or of graded size can be produced by proper selection of the elements of the foam generation unit 14.

3. Volume of foam generation.

Foam can be produced by a single generator and rates up to 400,000 gpm using equipment presently available commercially; this could process as much as 5,000,000 gpm of wastewater. The extra space requirement for high volume foam generating equipment is small over that for low capacity units, and the increase in cost is largely reflected in the size of the compressor required.

The rapidity with which the stable pregenerated foam bubbles separate from the liquid body makes it possible to treat higher volumes of liquid without scaling up the equipment in the same proportion. By contrast, there is almost linear relationship between equipment size and capacity in prior art flotation.

For both processes, the input wastewater handling equipment, the equipment needed to decant the foam and the equipment needed for disposal of the extracted pollutant sludge would be substantially the same. It may be noted, however, that the pregenerated foam process concentrates the pollutant into about half the volume of foam liquid that results from froth flotation, thereby minimizing the volume of sludge that must be handled.

4. Gas volume requirements per volume of liquid processed.

Since pregenerated foam can be turbulently dispersed in the body of wastewater being processed, relatively small volumes of foam are needed to contact and adsorb all the polluting particulates. The amount of foam required will vary with the physical characteristics of the particulate matter and the intensity of the surface active forces that can be produced by the chemical agents used. In general, it has been determined that one volume of foam will treat from 5 to 20 volumes of wastewater and that in the majority of cases the range is 10 to 12 volumes of wastewater.

The volume of air required for froth flotation processes varies quite widely, in part being dependent on the design of equipment used, particularly the air diffusion elements. A few dissolved air systems have achieved satisfactory flotation treatment using only one volume of air per 3 to 10 volumes of wastewater and low flow rates. Most froth flotations, however, require from 1 to several hundred volumes of gas to purify a single volume of wastewater. The impact of this high air demand on cost and time required for processing is obvious.

5. Processing time requirements.

It is evident from the foregoing discussion of distinctions between the two flotation processes that the time required to contact, adsorb and float the polluting material in wastewater is significantly less for the pregenerated foam process of the present invention. For continuous flow operation, the blending period is 2 to 10 seconds, usually less than 5 seconds. The stable foam bubbles float promptly to the surface for continuous decantation, and the clarified water is continuously withdrawn from the bottom of the separation vessel. There is little difference in the time required per volume of wastewater for processing high versus low flow rates; the rate of foam generation can be readily adjusted to maintain the foam-to-wastewater ratio required, the large volume retention chambers to still or slow the wastewater stream velocity are unnecessary.

The time required for froth flotation processing depends considerably on the design of the equipment used, and ranges from 10 to 60 minutes; majority of operations appear to require 20 to 35 minutes retention time.

6. Degree of concentration of particulate solids.

The solids content of wastewaters ranges from 0.1% to 5%, and in most cases the content is less than 1%.

Simple aeration processes generally concentrate the solids into 10 to 20% of the wastewater volume. The solids are subsequently removed from this fraction by conventional filtration, settlement, aerobic decomposition, etc.

Most froth flotation systems will isolate the particulate solid into 2–10% of the volume of wastewater processed.

Pregenerated foam flotation concentrates the solids into 0.5 to 2.0% of the total volume of wastewater processed.

The advantages of minimizing the sludge volume are the savings in equipment, labor and space in ultimate disposal, and in fuel economy where drying of the extract is involved.

7. Method of use of foaming agents.

In froth flotation, small amounts of foaming agent are sometimes used to expedite and stabilize the extraction. If an excess is used, there is the risk that some will remain dissolved in the treated effluent as substituted contaminent, requiring additional aeration for removal.

For pregenerated foams, the average concentration of agent in the foam solution is about 0.5%. For treatment of 1000 gallons of wastewater (8333 pounds), 100 gallons of a 2.5 pcf foam would be required, this being 33.3 pounds or about 4 gallons of foam solution. The foam solution contains 0.5%, or 0.17 pounds, of pure foam agent. The same amount of agent dispersed in the wastewater, as used in froth flotation, gives a concentration of only 0.0002%, or 20 ppm, too dilute to be effective in the formation of stable froth or foam. Thus by use of pregenerated foam, the surfactant capabilities of the foam agent are concentrated to a high level of efficiency, so that the bubble and its film both collect and quickly float the polluting specie, using only small amounts of foaming agent. In many instances, the foam solution can also be recovered by drainage or filtration from the extracted solids, and reused for additional economy. Very little agent is lost by dissolving in the wastewater; the average has proven to be less than 1% of the total agent used.

B. Chemical

Fairly extensive bibliography is available dealing with the various aspects of colloid, surfactant and physical chemistry and thermodynamics of films and adsorption. The principles that apply to froth flotation in general apply to pregenerated foam flotation as well. Accordingly, the chemical aspects of the use of pregenerated foams are discussed hereinafter in terms of how the method itself makes possible broader and more effective use of the available knowledge.

Pregeneration of foam makes it possible to compound and incorporate several agents or reagents into a single film where they can interact to supplement each other, to produce effects not possible if they were separately added to large volumes of wastewater, to make the film capable of performing more than one function, e.g. to collect more than one species, and for various other useful functions.

1. Thickening agents can be added to increase the stability of the foam film, to reduce the rate at which foaming agent or other agents incorporated in the film would dissolve in the liquid body, to act as buffers or carriers, to extend expensive foaming agents, and for many other purposes. Many thickening agents are, by themselves, capable of being generated into excellent foams and thus can be used to supplement agents that have excellent collecting capability for polluting species but do not produce sufficiently stable films when used alone. Thickening agents can be used to buffer foams against detrimental changes in the wastewater pH or other characteristics.

2. Blends of two or more surface active agents, the properties of which may enhance each other, can be made, e.g. two agents may be specific for two different polluting specie and blended simultaneous removal. Powerful specific surfactants that are poor foam agents can be supplemented by strong foamers.

3. The collector agent can be incorporated in the foam film in some cases, thereby eliminating the dosing step required in froth flotation.

4. Foam films can be made to carry a variety of agents or reagents useful to purification of wastewater. Some examples would be chelating agents, polymers of various types, ion absorption agents, anti-bacterial compounds that cannot safely be left in the effluent, agents for adsorption of gases, agents that will coagulate or agglomerate the collected species in the film for easier extraction from the foamate, and many other specific functions.

5. Foams can be compounded to adsorb dissolved materials and precipitate them with reagents included in the film composition. Normally, precipitation of dissolved gases and other materials in very dilute solutions, such as in wastewater, produces ultrafine precipitate particles which can themselves be extremely difficult to extract. It is therefore advantageous to produce the reaction in the bubble film, a procedure convenient to pregenerated foam technique but not possible by froth flotation.

6. Agents can be incorporated into the films to enhance polarity, increase surface charge, increase hydrophilic or hydrophobic tendencies, etc. Non-ionic or non-polar foaming agents can be used, with other agents being added to create specific properties in the film.

7. The advantage of concentrating reagents and surfactants in the film of pregenerated foam and causing such highly surface active, stable foam bubble to circulate in wastewater to contact polluting specie can be shown by example. If the foam liquid contains 1% surfactant, the concentration in the foam film liquid is 10,000 ppm. One cubic foot of this foam (2.5 lbs.) will, on the average, treat 10 cu. ft. (625 lbs.) of wastewater and substantially all of this surfactant will be removed as foamate carrying the polluting specie with the floating specie. If this same amount of surfactant is instead added directly to the same 10 cu. ft. (625 lbs.) of wastewater, the concentration would be only 40 ppm, far from enough to provide effective flotation. Expressed another way, the high concentration of surfactant in the films of the pregenerated foam behaves like powerful magnets in accumulating particles and the foam can be circulated in the wastewater for relatively long periods to insure complete collection. Turbulence will not disrupt the particle-to-bubble bond during such blending; removal is quickly accomplished with a minimum of gas volume.

The pregenerated foam flotation process has herein been discussed mainly in terms of aqueous systems and air as the gaseous phase. The principles and merits apply to all liquids, however, and any convenient gas or vaporized liquid can be used instead of air, if desired. Foam agents used for treatment of wastewaters are usually diluted to concentrations of 0.25–1.0% aqueous solutions, but foams can be made with oils, alcohols, and many other liquids, for use with aqueous wastewaters or non-aqueous liquids. Thus the pregenerated foam can be used for a variety of purposes in the chemical industry; relatively small amounts of liquid, with or without supplemental agents or reagents dissolved or carried therein, when pregenerated into foam, can be made to conveniently present an enormous surface for reaction or interaction with large quantities of other liquids. The gas of the foam can itself be used as a reagent, with the foam films serving as a vehicle or to initiate an intermediary reaction with reagents in the main liquid body.

We claim:

1. A process for removal of discrete particulates from wastewater by foam flotation which comprises the steps:
    (a) adding at least one agent to the wastewater containing the particulates to alter the surface charge of said particulates;
    (b) preparing a foam solution comprising a foaming agent dissolved in a solvent, said foaming agent being specifically ionic for attracting the surface charge of the particulates to be removed;
    (c) mixing said foam solution with a gas to produce a pregenerated foam of bubbles having surface active ionic films;
    (d) blending said pregenerated foam with the wastewater containing the particulates for a period of time sufficient to insure that substantially all the particulates will contact the surface active films of said bubbles and ionically attach thereto;
    (e) discharging said blend into a chamber wherein said blend is able to flow at a diminishing velocity, whereby said bubbles rise from the liquid to freely coalesce into a floating layer in the upper portion of said chamber and a clarified wastewater which is separately withdrawn from said chamber for disposal; and
    (f) removing the coalesced foam layer containing the floated particulates for disposal.

2. A process for removal of discrete particulates from wastewater by foam flotation which comprises the steps:
    (a) preparing a foam solution comprising at least one foaming agent dissolved in a solvent;
    (b) dissolving in said foam solution at least one additional agent specifically ionic for the collection and flotation of the particulates to be removed;
    (c) mixing said foam and agent solution with a gas to produce a pregenerated foam of bubbles, the films of which have an ionic surface active charge imparted by said added agent;
    (d) blending said pregenerated foam with the wastewater containing the particulates for a period of time sufficient to insure that substantially all the particulates will contact the surface active films of said bubbles and ionically attach thereto;
    (e) discharging said blend into a chamber wherein said blend is able to flow at a diminishing velocity, whereby said bubbles rise from the wastewater to freely coalesce into a floating layer in the upper portion of said chamber and a clarified wastewater which is separately withdrawn from said chamber for disposal;
    (f) removing the coalesced foam layer containing the floated particulates for disposal.

3. A process according to claim 2, including the step of adding at least one additional agent to the wastewater containing the particulates to alter the surface charge of said particulates to facilitate the interaction between the surface active films of said bubbles and the thus activated surfaces of the particulates to be removed, whereby said particulates become attached to said surface active films.

4. A process for removal of dissolved matter from wastewater by foam flotation which comprises the steps:
  (a) preparing a solution of at least one agent specific to precipitate the dissolved matter being sought;
  (b) dissolving in said solution a foaming agent capable of forming bubble films having a surface active charge specifically attractive to the precipitate to be formed;
  (c) mixing said solution with a gas to produce a pregenerated foam of bubbles having surface active ionic films;
  (d) blending said pregenerated foam with the wastewater containing the dissolved matter to insure that substantially all said wastewater is brought into contact with the surface active films of said bubbles, whereby the dissolved matter is reacted with the precipitating agent in said foam film and the precipitate retained therein;
  (e) discharging said blend into a chamber wherein said blend is able to flow at a diminishing velocity, whereby said bubbles rise from the liquid to freely coalesce into a floating layer in the upper portion of said chamber and a clarified wastewater which is separately withdrawn from said chamber for disposal; and
  (f) removing the coalesced foam layer containing the precipitate for removal.

* * * * *